United States Patent

[11] 3,609,459

| | | |
|---|---|---|
| [72] | Inventor | Samuel A. Thompson<br>Wilmington, Del. |
| [21] | Appl. No. | 13,430 |
| [22] | Filed | Feb. 24, 1970 |
| [45] | Patented | Sept. 28, 1971 |
| [73] | Assignee | General Electric Company |

[54] VARIABLE VOLTAGE COMPENSATED LOAD MEASURING CIRCUITS FOR CONTROLLED CLOSURE OF SINGLE-POLE DEVICES
15 Claims, 2 Drawing Figs.

[52] U.S. Cl. ..................................... 317/23,
317/27, 317/31
[51] Int. Cl. ..................................... H02h 3/26
[50] Field of Search .......................... 317/23, 27, 31

[56] References Cited
UNITED STATES PATENTS
| | | | |
|---|---|---|---|
| 1,676,313 | 7/1928 | Anderson .................... | 317/23 |
| 1,677,328 | 7/1928 | Butcher ...................... | 317/23 |
| 2,691,747 | 10/1954 | Griffin ......................... | 317/23 |

*Primary Examiner*—James D. Trammell
*Attorneys*—J. Wesley Haubner, Barry A. Stein, Frank L. Neuhauser, Oscar B. Waddell and Joseph B. Forman

ABSTRACT: Disclosed is a recloser relay control circuit for use in a traction system wherein a circuit breaker supplies direct current to a load from a bus supplied by a high-voltage source. Upon the occurrence of a fault in the system, the circuit breaker will open to deenergize the load. At this time, the recloser control circuit is inserted into the system to monitor the load resistance and source voltage and to prevent the circuit breaker from reclosing until these monitored parameters attain respective preselected threshold values. The control circuit includes a modified wheatstone bridge circuit utilizing a voltage-compensating subcircuit. The current flowing through the center arm of the bridge, which is a function of the source voltage and the load resistance, and the current flowing through the subcircuit, which is a function of source voltage alone, are algebraically combined in a first detector which provides a "close" signal when the load resistance is equal to or greater than the preselected threshold value. A second detector is utilized to provide a "close" signal when the source voltage equals or exceeds the preselected threshold value. The second detector utilizes the current flowing through the subcircuit as its input. Upon the contemporaneous presence of the "close" signals from each detector the circuit breaker is allowed to reclose thereby reenergizing the load. A diode is provided in the center arm of the bridge to allow the utilization of a low power resistor in the bridge branch paralleling the load resistance.

PATENTED SEP 28 1971 3,609,459

INVENTOR:
SAMUEL A. THOMPSON,
BY Barry A. Stein
ATTORNEY

3,609,459

VARIABLE VOLTAGE COMPENSATED LOAD MEASURING CIRCUITS FOR CONTROLLED CLOSURE OF SINGLE-POLE DEVICES

BACKGROUND AND OBJECTS OF THE INVENTION

My invention relates generally to circuit interrupter controls and more particularly to a control circuit for detecting the presence of predetermined load conditions and controlling the closing of a circuit breaker in response thereto. The control circuit of my invention has particular application in an electric power system using a circuit breaker to conduct direct current from a voltage source to an electric power load, such as a traction system.

In such a system, in the event that a circuit breaker has interrupted current to the load in response to the detection of a fault, it is desirable to check the load resistance and source voltage before allowing the breaker to reclose. By so doing the breaker can be prevented from reclosing until the fault has cleared.

Conventional wheatstone bridge circuits have been utilized in the past for measuring load resistance during the period that the load current in interrupted by the system circuit breaker but the us of such bridges hasn't been entirely satisfactory since source voltage variations may introduce errors in the load resistance measurement.

Accordingly, it is an object of this invention to provide an improved bridge-control circuit which, upon the opening of a system circuit breaker, is inserted in the power system so as to determine when at least a preselected threshold load resistance is present.

It is a further object to provide such a modified bridge-control circuit with voltage-compensating means to compensate for the effects that varying source voltage may have on the load resistance measurement.

It is a further object of this invention to provide for reclosing of the system circuit breaker upon the determination of the existence of the predetermined threshold source voltage and load resistance.

In a typical traction system the source voltage is normally relatively high (e.g., 500–1000 volts) while the normal load resistance is on the order of 1 ohm or less. Therefore, if a conventional wheatstone bridge circuit is utilized to measure load resistance in such a system, a low-resistance, high-power resistor would be required in the branch paralleling the load, for in the event that the load resistance became higher than the preselected level a large amount of current would be driven through the parallel resistor by the high-voltage source thereby subjecting the resistor to heavy energy dissipation duty. Use of a low-resistance, high-power resistor results in added expense, size and thermal dissipation problems.

Accordingly, it is a further object of this invention to provide a modified bridge circuit which is adapted to measure low-resistance loads in a high-power system wherein said bridge is protected from high currents flowing therethrough as a result of the existence of a high-load resistance.

SUMMARY OF THE INVENTION

In carrying out my invention in one form I have provided a recloser relay control circuit for use in a traction system wherein a circuit breaker supplies direct current to a load from a voltage source (a bus network). Upon the occurrence of a fault (i.e., short circuit) in the traction system the breaker will interrupt the flow of current to the load. Simultaneous with the interruption of load current by the breaker the recloser relay control circuit will be inserted in the power system.

The function of the recloser relay control circuit is to reclose the circuit breaker provided that conditions are such that the breaker will not be immediately tripped again. This control circuit employs a variation of a wheatstone bridge to accurately determine the bus load resistance. The value of the bus load determines the amount of current in the center arm of the bridge. This current level is a function of the source voltage and the bus load resistance. Since source voltage variation may introduce measurement errors I provide a voltage compensation subcircuit. The current level in the compensation subcircuit is solely a function of the source voltage. The center arm in opposite directions, as inputs to a magnetic amplifier so that as signal inputs they subtract from each other thereby resulting in a net signal current which is independent of bus voltage variations. The net signal current level is sensed by the magnetic amplifier whose output is connected to a relay to give either a "close" or "no close" signal to the breaker depending upon the saturation condition of the magnetic amplifier.

I will utilize a second magnetic amplifier to sense the existence of a predetermined threshold voltage level before the breaker is permitted to reclose. This amplifier utilizes the current flowing through the compensation subcircuit as its signal input.

When the predetermined source voltage and load resistance conditions exist a "close" signal is given to the breaker thereby enabling it to reclose. As the circuit beaker is reclosed the recloser relay control circuit is electrically disconnected from the power system.

In the interests of accuracy and economy the bridge circuit is provided with a diode which is connected in series in the center arm to preclude a large current from flowing through the bridge branch paralleling the load in the event that the load resistance becomes greater than the preselected threshold value (e.g., an open circuit). This modification allows the resistor in the bridge branch paralleling the load to be chosen near in value to the predetermined threshold value thereby sensitizing the bridge for determining the existence of the predetermined threshold load resistance.

BRIEF DESCRIPTION OF THE DRAWINGS

This invention will be better understood and its various objects and advantages will be more fully appreciated from the following description taken in conjunction with the accompanying drawing in which.

DESCRIPTION OF THE PREFERRED EMBODIMENT

Figure 1:
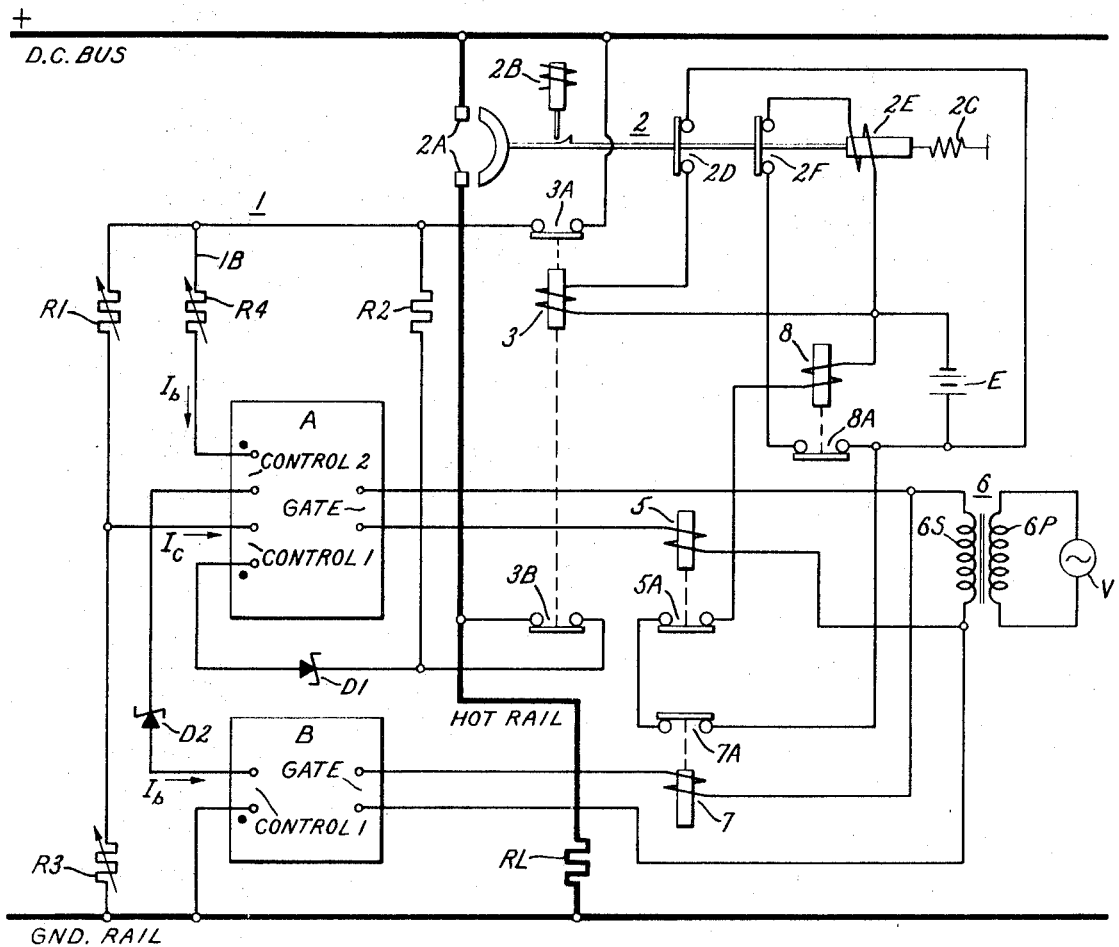
FIG. 1 is a schematic circuit diagram of a traction system embodying features of my invention.

FIG. 1 shows a portion of the power circuit of an electrical traction system powering electric transit vehicles. The DC bus shown is a common bus for a plurality of hot rail sections (only one of which is shown). Each hot rail section is fed from the DC bus by a respective feeder circuit breaker 2. The voltage source (not shown) is adapted to provide high voltage to the traction system. The positive terminal of the source is connected to the DC bus while its negative terminal is connected to the ground rail. A bus load is connected between the hot rail and the ground rail and is, upon the closure of feeder circuit breaker 2, supplied with electric power. While the bus load is normally the motor of a traction vehicle itself it may nevertheless by anything bridging the hot rail and the ground rail.

Feeder circuit breaker 2 is provided to protect against the occurrence of a fault on the local hot rail section by opening and deenergizing that section in response to the detection of the fault. A control circuit 1 is provided for preventing circuit breaker 2 from reclosing until preselected thresholds of source voltage an load resistance exist. In FIG. 1, I have shown the condition of the traction system upon the detection of proper source voltage and load resistance immediately prior to the reclosing of circuit breaker 2.

To best appreciate my invention we shall assume that the traction system has just been subjected to a fault (e.g., a crowbar has fallen across the local section of the hot rail and the ground rail thus shorting them together). Upon the detection of the short circuit current by suitable protective means (no shown), trip coil 2B is energized thereby unlatching the breaker trip mechanism. When the trip mechanism is unlatched bias spring 2C causes contacts 2A to open thereby interrupting the flow of current through the load RL. Simultaneously with the opening of the main contacts 2A, auxiliary contacts 2D are closed thereby resulting in the energization of bridge inserter relay 3 and the closing of its pairs of "normally open" contacts 3A and 3B. The closure of contacts 3A and 3B results in the insertion of control circuit 1 into monitoring position in the traction system.

Control circuit 1 utilizes a modified wheatstone bridge circuit. As shown, it is seen to comprise four resistance branches, namely R1, R2, R3 and RL. Resistors R1 and R2 are connected together at a second point, resistors R1 and R3 are connected together at a third point and resistor R2 and load RL are connected together at a fourth point. The center arm of the bridge is connected between the third and fourth points. A diode D1 is provided in the center arm with its cathode connected to the fourth point through closed contacts 3B. The function of diode D1 will be discussed later.

As is known in the art a wheatstone bridge can be utilized to determine the magnitude of an unknown resistance by appropriately selecting the values of its standard branch resistors and measuring the current flow through its center arm. I utilize a modified wheatstone bridge configuration to determine whether or not the resistance of a load is a sufficient magnitude (called the predetermined threshold load resistance) to permit the circuit breaker to reclose. By setting the values of the variable resistors R1 and R3, I condition the bridge to detect the presence of a particular threshold load resistance which is deemed sufficient to allow the breaker to reclose under given operating conditions. In conjunction with the bridge I provide a detecting means which is responsive to the amount of current flowing through the center arm to give a signal indicative of the existence of the predetermined threshold load resistance.

In practice the source voltage energizing the DC bus is not always constant, and it can vary enough to cause errors in a load resistance measurement by a bridge circuit. Therefore, I have provided means to insure that control circuit 1 will detect the presence of the predetermined load resistance irrespective of fluctuating source voltage. In this regard I make use of a voltage compensation subcircuit 1B which is connected between the aforesaid first and second points. This subcircuit includes a variable resistor R4 and a zener diode D2 poled in opposition to the source voltage. Thus, as shown the anode of D2 is connected to the common point of resistor R3 and the load RL.

The current $I_c$ flowing in the center arm of the wheatstone bridge will be a function of both the unknown load resistance and the existing source voltage across the bridge. On the other hand the current $I_b$ which will flow through the subcircuit 1B will be solely dependent upon the existing source voltage across the bridge for any given value of R4. Accordingly, to compensate for the effect of source voltage variations on the load resistance measurement, I use a detector "A" which algebraically combines the two signal currents ($I_c$ and $I_b$) such that signal current $I_b$ is subtracted from signal current $I_c$, whereby detector A is controlled by a net $I_c-I_b$. By appropriately selecting the various resistors in the bridge and in the subcircuit 1B I am able to make the net signal independent of the existing source voltage whenever the load resistance is equal to the desired threshold value.

While detector A may be an electronic device, it is preferably a magnetic amplifier since such a device offers the advantage of providing electrical isolation between its control circuit and its output (power) circuit. Detector A is therefore preferably an amplistat having two signal inputs (shown as control 1 and control 2).

The current $I_c$ flowing through the center arm of the bridge provides a signal current to a first control winding of the amplistat A while the current $I_b$ flowing through the voltage compensation subcircuit 1B provides a signal current to a second control winding of the amplistat. The polarity of the inputs to amplistat A, shown by the conventional dot notation, is so arranged that the net input signal $I_n$ acting on the amplistat is equal to the difference between $I_c$ and $I_b$ (i.e., $I_c-I_b$).

Figure 2:
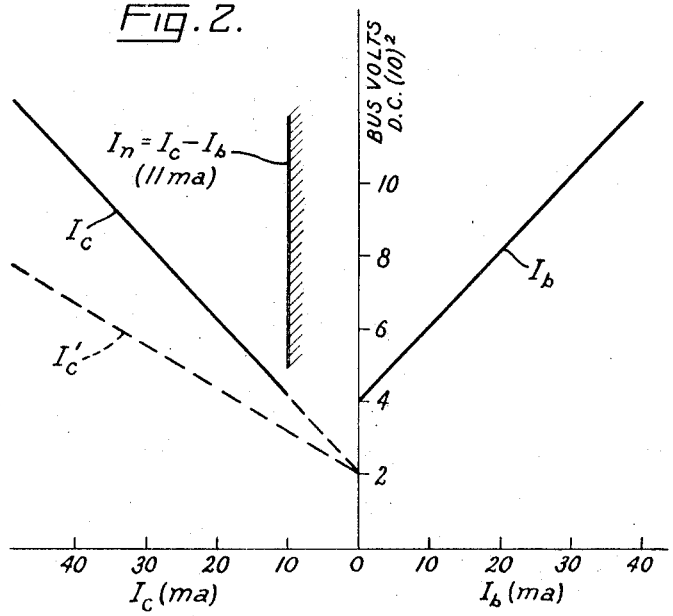
FIG. 2 is a graphical representation of certain signal currents flowing in the circuit of FIG. 1.

FIG. 2 is a graphical representation of the signal currents flowing anytime the actual load resistance is equal to the resistance that the bridge is set to signal currents flowing anytime the actual load resistance is equal to the resistance that the bridge is set to detect (the preselected threshold load resistance). As can be seem from FIG. 2 for all values of source voltage above 400 volts the net input signal current ($I_c-I_b$) is constant (11 milliamps). Accordingly, by designing amplistat A to go into saturation at any time the net signal current is less than the value 11 ma. (as represented by the shaded portion of FIG. 2) the presence of the preselected threshold load resistance can be determined by monitoring the gate windings or output of the amplistat. When the load resistance is below the preselected threshold value a greater amount of current $I_c$ will flow through the center arm of the bridge. In FIG. 2 I have shown a center arm current $I_c'$ which is representative of the existence of a subnormal load resistance. As should be immediately be apparent with a subnormal load resistance the et input signal $I_c'-I_b$ to amplistat A will be greater than 11 ma. This will result in driving amplistat A out of saturation.

The output of amplistat A is connected in series with the coil of a relay 5 and the secondary 6S of a constant voltage transformer 6. The primary 6P of this transformer is supplied by an alternating voltage source V. When amplistat A is in saturation most of the voltage applied from the secondary of the transformer will appear across the coil of relay 5 thereby energizing it and thus causing its contacts 5A to be closed (as shown). When amplistat A is unsaturated most of the applied voltage will appear across its gate windings rather than the coil of relay 5. In this case relay 5 will be deenergized and contacts 5A will be open. Accordingly, it should be appreciated that when amplistat A is saturated a "close" signal is derived from its output (gate) whereas when it is unsaturated a "not close" signal is derived from its output.

Due to fluctuations in the source voltage, it is also desirable to determine whether the source voltage has attained a predetermined level (e.g., 500 volts) before permitting the circuit breaker to reclose even assuming that a proper load resistance exists. In this regard I provide another detector "B" which is also preferably an amplistat. The only input to this amplistat is signal current $I_b$. Amplistat B is designed to be driven out of saturation in the event of a signal input current $I_b$ greater than a predetermined magnitude. Zener diode D2 is preferably chosen to have a breakdown voltage equal to 400 volts. Therefore, if the source voltage falls below the zener breakdown voltage no $I_b$ current will flow (see FIG. 2), and amplistat B will remain saturated. Once the source voltage surpasses the zener breakdown voltage it will commence conducting current. When the current $I_b$ attains the predetermined level indicative of the source voltage threshold the amplistat will be driven out of saturation.

The output (gate) of amplistat B is connected in series with the coil of a relay 7 and the secondary 6S of the constant voltage transformer 6. Therefore, when amplistat B is saturated most of the voltage applied from the secondary of the transformer will appear across the coil of relay 7 thereby energizing it, whereas when amplistat B is unsaturated most of the applied voltage will appear across its gate windings thereby deenergizing the coil of relay 7 and permitting its "normally closed" contacts 7A to remain closed. Accordingly when amplistat B is saturated a "not close" signal is derived from its output whereas when it is unsaturated a "close" signal is derived from its output.

FIG. 1 shows the condition where amplistat A has detected the existence of the predetermined threshold magnitude of load resistance and amplistat B has detected the existence of the predetermined threshold voltage level thereby providing respective "close" signals. This condition exists immediately before the breaker is reclosed.

Upon the closure of contacts 5A and 7A auxiliary relay 8 is energized by the control voltage source E, whereupon this relay operates to close its contacts 8A. Upon the closure of contacts 8A, closing coil 2E of circuit breaker 2 is energized through auxiliary contact 2F. Once coil 2E is energized it will cause the contacts 2A to reclose. Simultaneous with the closure o contacts 2A contacts 2D open thereby deenergizing bridge inserter relay 3 thus causing the control circuit 1 to be disconnected from the power system by disconnecting the common juncture of resistors R1, R2 and R4 from the bus source and also disconnecting the cathode of diode D1 from it. Upon the closure of contacts 2A full power is restored to the load and the traction system is again operable and reset for interruption in case a fault should subsequently occur.

Use of diode D1 has obviated a number of drawbacks inherent in utilizing a conventional wheatstone bridge to measure load resistance in a power system. It will be remembered that in a wheatstone bridge circuit sensitivity increases as the value of R3 approaches the value of the unknown resistance (the load). Accordingly, in a traction system wherein the normal load resistance is of the order of 1 ohm or less the value of the R3 resistor in the bridge must be chosen correspondingly low. In the event that the load resistance becomes very high, the available several hundred volt source voltage will necessarily drive a large amount of current through the low-resistance R3 resistor in lieu of through the high-resistance load thus necessitating use of a high-power R3 resistor. Needless to say that use of high-power, low-resistance resistors in a bridge circuit result in size disadvantages, thermal dissipation problems and increased manufacturing costs.

I have found that by placing diode D1 in the center arm of the bridge I am able to utilize a much lower power resistor for R3 than otherwise possible. The effect of diode D1 is to isolate the source voltage from that resistor and thereby preclude the flow of high current therethrough in the event that the load resistance becomes greater than the preselected threshold value. This modification not only provides economic advantages but also increases circuit sensitivity to minute load resistance changes.

As previously noted the DC bus, shown in FIG. 1, is contemplated as being a common bus that supplies power to other sections of the hot rail through their own individual sectionalizing circuit breakers, similar to circuit breaker 2. Each of such breakers is equipped with a reclosing control like that shown and claimed. I also contemplate that circuit breaker 2 might be connected directly to another section of the hot rail instead of to the DC bus. In such a configuration what is labeled in FIG. 1 as the DC bus would in fact be the hot rail itself and the circuit breaker 2 would thus be a bus tie breaker.

It should be appreciated that while I have disclosed using magnetic amplifiers for the detectors of my invention any other type of detector, as will be obvious to those skilled in the art, may be used. Therefore, it will be obvious that this modification and others may be made without departing from my invention in its broader aspects. I therefore intend to cover all such changes and modifications as fall within the true scope and spirit of my invention.

What I claim as new and desire to secure by Letters Patent of the United States is:

1. In combination with a circuit breaker that normally conducts direct current from a voltage source to an electric power load, a control circuit effective when said circuit breaker has interrupted the flow of current to the load for preventing the circuit breaker from reclosing if the load resistance is lower than a predetermined magnitude, said control circuit comprising:

a. first detecting means responsive to the algebraic sum of two input signals, the first of said signals being a function of the source voltage and the load resistance, the second of said signals being a function of the source voltage along whereby the sum of said signals is a function of load resistance, said fist detecting means producing a first output signal whenever said sum is no greater than a predetermined value which corresponds to a load resistance of said predetermined magnitude; and b. means operative in response to the production of said first output signal of said first detecting means for enabling said circuit breaker to reclose.

2. The combination of claim 1 wherein said control circuit additionally comprises:

c. second detecting means responsive to said second input signal for producing a second output signal whenever said second input signal equals or exceeds a magnitude corresponding to a predetermined level of source voltage, and wherein said enabling means is operative only in response to the contemporaneous presence of both of said first and second output signals.

3. The combination of claim 1 wherein said first and second input signals are derived by a bridge including first, second and third resistance branches and a fourth resistance branch which is said load, each of said branches having a first and second end, the first ends of said first and second branches being connected to said voltage source a first point, the first ends of said third and fourth branch being connected at a second point, the second end of said first branch and the second end of said third branch being connected at a third point, the second end of said second branch and the second end of said fourth branch being connected at a fourth point, first interconnecting means connecting said third point and said fourth point, second interconnnecting means connecting first point and said second point, said first interconnecting means providing said first input signal, said second interconnecting means providing said second input signal.

4. The combination of claim 3 wherein said first interconnecting means includes a diode whose cathode is connected to said fourth point.

5. The combination of claim 2 wherein said first and second inputs signal are derived from a bridge including first, second and third resistance branches and a fourth resistance branch which is said load, each of said branches having a first and second branches being connected to said voltage source at a first point, the first ends of said third and fourth branches being connected at a second point, the second end of said first branch and the second end of said third branch being connected at a third point, the second end of said second branch and the second end of said forth branch being connected at a fourth point, first interconnecting means connecting said third point and said fourth point, second interconnecting means connecting said first point and said second point, said first interconnecting means providing said first input signal, said second interconnecting means providing said second input signal.

6. The combination of claim 5 wherein said first interconnecting means includes a diode whose cathode is connected to said fourth point.

7. The combination of claim 6 wherein said second interconnecting means comprises a zener diode poled in opposition to the source voltage, said zener diode having a breakdown voltage lower than the level of source voltage at which the second detecting means produces the second output signal.

8. The combination of claim 7 wherein means are provided to disconnect said control circuit from said voltage source and said load when said circuit breaker is closed.

9. The combination as specified in claim 4 wherein means are provided to disconnect the control circuit from said voltage source and said load when said circuit breaker is closed.

10. The combination of claim 7 wherein said first and second detecting means are magnetic amplifiers and wherein said first input signal is the current flowing through said first interconnecting means and wherein said second input signal is the current flowing through said second interconnecting means.

11. The combination of claim 4 wherein said first detecting means is a magnetic amplifier and wherein said first input signal is the current flowing through said first interconnecting means and wherein said second input signal is the current flowing through said second interconnecting means.

12. The combination of claim 10 wherein the resistance of said first and third branches is variable.

13. The combination of claim 11 wherein the resistance of said first and third branches is variable.

14. The combination of claim 12 wherein said second interconnecting means also comprises a variable resistance element.

15. The combination of claim 13 wherein said second interconnecting means also comprises a variable resistance element.